United States Patent [19]

McClure et al.

[11] Patent Number: 4,698,382
[45] Date of Patent: Oct. 6, 1987

[54] PLASTICIZED POLY(VINYL FLUORIDE)

[75] Inventors: George R. McClure, Claymont; Eustathios Vassiliou, Newark, both of Del.

[73] Assignee: E. I. Du Pont de Nemours and Company, Wilmington, Del.

[21] Appl. No.: 914,152

[22] Filed: Sep. 30, 1986

[51] Int. Cl.⁴ ................................................. C08J 5/09
[52] U.S. Cl. ..................................... 524/292; 524/295
[58] Field of Search ................ 524/292, 295, 296, 298

[56] References Cited

U.S. PATENT DOCUMENTS

| | | | |
|---|---|---|---|
| 3,207,765 | 9/1965 | Pare | 260/346.3 |
| 3,351,604 | 11/1967 | Safford et al. | 260/31.8 |
| 3,807,072 | 4/1974 | Graham | 524/292 |
| 4,183,837 | 1/1980 | Tamura et al. | 524/315 |
| 4,464,502 | 8/1984 | Jacobs | 524/411 |
| 4,605,694 | 8/1986 | Walker | 524/292 |
| 4,620,026 | 10/1986 | Siegel | 524/292 |

FOREIGN PATENT DOCUMENTS 59-162083  12/1984  Japan .

*Primary Examiner*—Paul R. Michl
*Assistant Examiner*—Peter D. Mulcahy
*Attorney, Agent, or Firm*—Richard H. Burgess

[57] ABSTRACT

Polyvinyl fluoride is plasticized with trimethyltrimellitate or related low molecular weight mellitates or phthalates without exudation.

7 Claims, No Drawings

PLASTICIZED POLY(VINYL FLUORIDE)

BACKGROUND OF THE INVENTION

The invention involves plasticized poly(vinyl fluoride) (PVF).

Prior plasticized films and coatings of poly(vinyl halides) have generally been of poly(vinyl chloride) (PVC) even when they were stated to be generically useful with poly(vinyl halides) including poly(vinyl fluoride). Also, the plasticizers used with PVC often are of such high molecular weight that they are found to exude from PVF films upon heating to cure the films, such as at 200° C. for 10 minutes, or equivalent curing.

For instance, U.S. Pat. No. 3,351,604, Safford et al. (1967), uses trioctyl trimellitate or the isooctyl or 2-ethylhexyl trimellitates, or mixed trimellitates. The vinyl halide resins mentioned are poly(vinyl chloride) and poly(vinyl bromide).

U.S. Pat. No. 4,464,502, Jacobs (1984), deals mainly with PVC, although it mentions PVF. Among the plasticizers listed are tris(2-ethylhexyl) trimellitate, sometimes preferably blended with phthalates.

U.S. Pat. No. 3,207,765, Pare (1965), teaches copolymers including vinyl trimellitate-1,2-anhydrides with vinyl halides including vinyl fluoride.

Japanese Kokai No. 162,083/84 reportedly is concerned with PVC plastized with trimethyl trimellitate or dioctylphthalate, or other plasticizers.

The art does not teach how to make a plasticized PVF film which is flexible and drapable without exudation on curing.

SUMMARY OF THE INVENTION

The present invention provides a composition of poly(vinyl fluoride) plasticized with a plasticizer selected from the group consisting of trimethyltrimellitate, triethyltrimellitate, di(methoxyethyl)phthalate, and di(methoxyethoxyethyl)phthalate.

DETAILED DESCRIPTION

Trimethyl trimellitate can be used as a plasticizer for PVF in amounts up to 50 parts by weight per hundred parts PVF resin. Films made by doctor blade coating and curing for 10 minutes at 200° C. are at least as clear as the control films without plasticizer. They are also much more pliable than the coated films and have increased curtainability.

EXAMPLES

The following are examples of use of monomeric plasticizers in PVF.

In a one-liter sand grind unit were placed

| | |
|---|---|
| Poly (vinyl fluoride) powder | 200 g. |
| Propylene Carbonate | 400 g. |
| Trimethyltrimellitate | 40 g. |

The ingredients were sand ground in a conventional manner for 30 minutes and filtered through a screen.

When doctored onto a glass plate and baked 10 minutes at 200° C., this dispersion gave a clear flexible film free of exudate.

Compared to a film a film of poly(vinyl fluoride) prepared in a similar way, this film was more flexible and supple and less noisy during rapid flexing. When run on a differential scanning calorimeter between 25° and 200° C., the endotherm at 40°–45° C. in unplasticized PVF is not observed in the plasticized film. However, the melting endotherm at about 190°–192° C. was present in both films.

Films containing trimethyltrimellitate from 1–50 parts by weight per one hundred parts (phr) poly(vinyl fluoride) can be prepared by essentially the procedure outlined above.

As an indication of flexibiltiy imparted to poly(vinyl fluoride) by trimethyl trimellitate, films show the following moduli (at one percent elongation).

| Plasticizer Level | 0 | 10% | 15% |
|---|---|---|---|
| Modulus of PVF film (Kpsi) | 250 | 210 | 130 |

Similarly, certain other micromolecular materials are useful as plasticizers up to 30–40 parts per hundred parts poly(vinyl fluoride); when used above this level however, they exude from the film. These materials include Di(methoxyethyl)Phthalate
Triethyl Trimellitate
Di(methoxyethoxyethyl)Phthalate By contrast, many of the commonly used plasticizers for poly(vinyl chloride), such as di(2-ethylhexyl)phthalate, epoxidized vegetable oils, etc., are not useful in poly(vinylfluoride) because they exude even when used at low levels such as 10 phr.

We claim:

1. A composition of poly(vinyl fluoride) plasticized with a plasticizer selected from the group consisting of
   trimethyltrimellitate,
   triethyltrimellitate,
   di(methoxyethyl)phthalate, and
   di(methoxyethoxyethyl)phthalate.

2. The composition of claim 1 wherein the plasticizer is
   trimethyltrimellitate in amounts in range of 1–50 parts by weight per hundred parts of resin.

3. The composition of claim 1 wherein the plasticizer is
   triethyltrimellitate in amounts in the range of 1–40 parts by weight per hundred parts of resin.

4. The composition of claim 1 wherein the plasticizer is
   di(methoxyethyl)phthalate in amounts in the range of 1–40 parts by weight per hundred parts of resin.

5. The composition of claim 1 wherein the plasticizer is
   di(methoxyethoxyethyl)phthalate in amounts in the range of 1–40 parts by weight per hundred parts of resin.

6. The composition of claim 1 in the form of a clear flexible film free of exudate after baking the equivalent of 10 minutes at 200° C.

7. A film comprising the composition of claim 1.

* * * * *